United States Patent Office 3,766,229
Patented Oct. 16, 1973

3,766,229
DRILLING FLUIDS
Finis Turner and Jang-Woo Nahm, Houston, Tex., assignors to Dresser Industries, Inc., Dallas, Tex.
No Drawing. Continuation of abandoned application Ser. No. 867,365, Oct. 17, 1969. This application Aug. 19, 1971, Ser. No. 173,270
Int. Cl. C07f 13/00; C07g 17/00
U.S. Cl. 260—429 K
1 Claim

ABSTRACT OF THE DISCLOSURE

A drilling fluid dispersing agent and fluid loss control agent composed of salts of at least one of sulfonated lignite and sulfonated humic acid. A drilling fluid containing the dispersing and/or fluid loss control agent. A process for drilling, completing, or working over a well wherein a drilling fluid according to this invention is employed.

CROSS REFERENCES TO RELATED APPLICATION

This application is a continuation of application Ser. No. 867,365, filed Oct. 17, 1969, now abandoned.

BACKGROUND OF THE INVENTION

Heretofore sulfonated lignin salts wherein the cation of the salt was a heavy metal such as iron, aluminum, chromium, and the copper have been employed in drilling fluids. These materials have been termed "lignosulfonates" and have been limited to lignin such as that obtained from wood pulping processes and to the heavy metal cations set forth above.

SUMMARY OF THE INVENTION

It has now been unexpectedly discovered that a superior dispersing agent and/or fluid loss control agent for drilling fluids is obtained by employing one or more salts of sulfonated lignite and/or sulfonated humic acid wherein the cation for these salts is selected from two groups, group (1) consisting of alkali metals (lithium, sodium, potassium, rubidium, cesium, and francium, preferably lithium, sodium, potassium, and rubidium), alkaline earth metals (beryllium, magnesium, calciuc, strontium, barium, and radium, preferably beryllium, magnesium, calcium, and strontium), and an ammonium radical, and group (2) consisting of beryllium, boron, scandium, gallium, germanium, arsenic, yttrium, zirconium, niobium, molybdenum, technetium, ruthenium, rhodium, silver, cadmium, indium, tin, antimony, hafnium, tantalum, tungsten, osmium, iridium, platinum, gold, mercury, thallium, lead, bismuth, lanthanides (atomic numbers 57 through 71), and actinides (atomic numbers 89 through 92), vanadium, chromium, manganese, iron, cobalt, nickel, zinc, magnesium, aluminum, silicon, alkali metals as defined above, and alkaline earth metals as defined above.

The term "salt" as used in this invention includes both the classical salts obtained by the use of the cations of group (1) and the chelates or complexes obtained by the use of the cations of group (2).

This invention also relates to a drilling fluid which contains at least one of the innumerable clayey materials normally suspended or otherwise disposed in one of an aqueous base liquid, an organic base liquid, or combinations thereof, the drilling fluid containing an effective dispersing and/or fluid loss controlling amount of at least one of the agents of this invention.

This invention also relates to a process for drilling in, completing, and/or working over a well wherein the drilling fluid employed contains effective amounts of the agent of this invention.

This invention, in all its aspects, is useful in the drilling industry, particularly, but without limitation thereto, the drilling of oil and/or gas wells.

Accordingly, it is an object of this invention to provide a new and improved drilling fluid additive. It is another object to provide a new and improved dispersing and/or fluid loss control agent for use in drilling fluids. It is another object to provide a new and improved drilling fluid which has superior dispersing and fluid loss control characteristics. It is a further object to provide a new and improved process for drilling, completing, and/or working over wells using a drilling fluid which has superior dispersing and/or fluid loss control characteristics. It is a further object to provide a new and improved drilling fluid additive which has superior dispersing and/or fluid loss control characteristics even when employed in contaminated drilling fluids such as drilling fluids containing large amounts of dissolved inorganic salts such as sodium chloride, calcium sulfate, and the like.

Other aspects, objects, and advantages of the invention will be apparent to those skilled in the art from the disclosure and the appended claim.

DETAILED DESCRIPTION OF THE INVENTION

According to this invention a drilling fluid additive which has unexpectedly improved dispersing characteristics and/or unexpectedly improved fluid loss control characteristics when employed in conventional drilling fluids, be they water base or oil base or combinations thereof, is obtained from at least one salt of at least one of sulfonated lignite and sulfonated humic acid as defined hereinabove.

The salts of this invention can be employed alone or in combination with effective clay dispersing amounts of at least one of metal salts of lignosulfonate and metal salts of lignite, the metals being at least one of alkali metals as defined above, alkaline earth metals as defined above, iron, aluminum, chromium, and copper. The metal salts of lignosulfonate and/or lignite, when employed, are present in the weight ratio range of sulfonated lignite salt/lignosulfonate or sulfonated lignite salt/lignite salt of from about 5/1 to about 1/5.

The lignite employed in this invention is a variety of coal intermediate between peat and bituminous coal, especially one in which the texture of the original wood is distinct. Lignite is often called "brown coal" or "wood coal." Its chemical characteristics and composition have been widely described in literature, for example the Journal of American Chemical Society, vol. 69 (1947) and in the U.S. Bureau of Mines Information Circular 7691, parts 1 and 2, July 1954.

Lignite is to be sharply distinguished from lignin from which the lignosulfonate materials are prepared and which does not give the improved results achieved by this invention with the use of lignite. Lignin is a complex noncarbohydrate constituent obtained from wood, straw, corn stocks, bagasse, and the like and is substantially different chemically from lignite which is a coal material.

Lignite contains at least about 40 weight percent, preferably from about 50 to about 65 weight percent on the dry basis, humic acid. The precise molecular structure of lignite, as well as lignin, is unknown to a certainty at present at least partially due to its variable nature. Thus, the molecular structure of the reaction products therefrom, including the products of sulfonation and other processes, is unknown to a certainty at present. However, the starting material, lignite or humic acid, is well known, is available commercially, and compositions that fall within that class are readily ascertainable by those skilled in the art.

The agents of this invention containing the cations of group (1) are prepared by the reaction of the lignite and/ or humic acid with at least one cation donor and at least one sulfonate radical donor.

The agents of this invention containing the cations of group (2) are prepared by the reaction of the lignite and/or humic acid with at least one cation donor and at least one sulfonate radical donor either in the presence of a material containing a cation of group (2) or subsequently reacted with a material containing a cation of group (2).

The sulfonation reaction for all agents of this invention is conducted in an alkaline reaction medium which can be any conventional medium known in the art and which is substantially inert to the sulfonation reaction. Water is a commonly used medium although nonaqueous media can be employed where the lignite contains sufficient absorbed water for the reaction.

Cation donors for all agents of this invention include their hydroxides, carbonates, bicarbonates, and oxides of the alkali and alkaline earth metal defined hereinabove, and the ammonium radical. For example, and without limitation, hydroxides of sodium, lithum, potassum, calcium, magnesium, and ammonium can be employed as well as carbonates of sodium, potassium, and magnesium, and oxides of sodium, potassium, calcium, and magnesium.

The sulfonate radical donors for all agents of this invention include both sulfites and bisulfites of the alkali metals and alkaline earth metals as defined hereinabove, as well as sulfurous acid and sulfur dioxide. Preferred donors include, without limitation, the sulfites and metabisulfites of sodium, potassium, calcium, magnesium, lithium, and ammonium. Sulfurous acid can also be added to the alkaline reaction system and similar results are achieved by the addition of sulfur dioxide gas to the alkaline reaction medium.

The amount of cation donor compound or compounds added will vary widely but will generally be that which is sufficient to give the reaction medium a pH of at least about 7, preferably at least about 10, still more preferably from about 10 to about 13. Generally, but without limitation, the amount of cation donor or donors added to achieve this will be within the range of from about 5 to about 50 parts by weight based on the total weight of the lignite to be reacted.

The amount of sulfonate radical donor or donors will also vary widely depending upon the degree of sulfonation desired. Sufficient sulfonate donor should be added to effectively form a stable sulfonated product. Generally, at least about 5 parts, preferably from about 5 to about 50 parts, of sulfonate radical donor or donors can be employed based upon the total weight of the lignite to be reacted. It should be understood that less than quantitative conversion of the lignite to sulfonated lignite can be obtained but yet the superior dispersing and/or fluid loss control agent of this invention still achieved.

The varying degrees of sulfonation obtained depend in part on the well known ranges of conditions involved in the different methods of sulfonation. The chemical formula for the sulfonic acid group is —$SO_3H$, in which the sulfur atom is combined directly with the carbon atom in the lignite or humic acid. This type of sulfur is to be sharply distinguished from inorganic sulfates or sulfites, sulfur dioxide free or loosely associated with the lignite or humic acid, and sulfur which might be bound with the lignite or humic acid as a sulfate. The sulfonate sulfur (sulfur combined directly with carbon) is quite stable and not readily removed from the lignite or humic acid. The extent of sulfonation will vary widely but will generally be that which promotes the dispersing and/or fluid loss control characteristics of the lignite or humic acid.

The sulfonation reaction can be carried out at substantially any temperature including ambient and subambient but proceeds best at elevated temperatures, preferably from about 175 to about 480° F. for time periods of from about 2 to about 8 hours. The reaction pressure can be ambient or subambient but again the reaction proceeds better at elevated pressures such as from about 50 to about 800 p.s.i.g.

The cation donors and sulfonate radicals donors can be added to the reaction medium and/or reacted with the lignite or humic acid in any desired order or at substantially the same time. Generally, it is preferred that the cation donors be added first followed by the sulfonate radical donors. Stirring of the reaction medium and its contents can be advantageously employed during the reaction period.

The material or materials which donate one or more of the cations of group (2) to form a chelate or complex of the sulfonated lignite can be employed during the sulfonation reaction and/or after the sulfonation reaction is completed or substantially completed. In the process wherein the materials donating the cations of group (2) is employed during the sulfonation process, the sulfonation temperatures, pressures, and the like set forth hereinabove apply. In the process wherein the materials donating the cation of group (2) is employed after the sulfonation reaction, the same process requirements as set out hereinabove for the sulfonation reaction, e.g. the temperature ranges, pressure ranges, and the like, can also be employed. Generally, the amount of material donating the cations of group (2) used in that which is sufficient to supply cations of group (2) to form a stable lignitecation of group (2) complex or chelate. Generally, at least 5 parts, preferably from about 5 to about 25 parts, of the group (2) cation donor can be employed per 100 parts of lignite or sulfonated lignite. Greater than 25 parts of the group (2) cation donor can be employed without harm but large excesses can have little if any additional advantages.

Suitable group (2) cation donors include any material which is substantially inert to the sulfonated lignite but will yield the cations of group (2) for complexation or chelation of the sulfonated lignite. Nonlimiting examples of applicable donors include the sulfates, halides (preferably the chlorides, bromides, and iodides), and acetates of the group (2) cations set forth hereinabove. Particularly useful are ferrous sulfate, ferric sulfate, chromous or chromic sulfate, chromous or chromic chloride, chromous or chromic acetate, basic chromium chloride $$[Cr_5(OH)_6Cl_9 \cdot 12H_2O],$$

basic chromium acetate $[Cr_3(OH)_2(Ac)_2]$ wherein Ac stands for the conventional acetate radical $CH_3COO$—, basic chromic sulfate $[Cr(OH)(SO_4)$ or $$Cr_2(OH)_4(SO_4)],$$

potassium chrome alum manganese sulfate, and zinc sulfate.

It should be noted that the cations of group (1) above tend to form predominantly ionic bonded salts whereas the cations of groups (2) above tend to form complexes or chelates by covalent bonding with electron donors.

The drilling fluids to which the agents of this invention can be added can contain an effective viscosifying amount of conventional clays. Generally, from about 1 about 20 weight percent clay can be employed but this will vary widely depending upon the functional desires for the final drilling fluid and the clays employed. Suitable clays include kaolins (kaolinite, halloysite, dickite, nacrite, and endellite), bentonites (montmorillonite, beidellite, nontronite, hectorite, and saponite), hydrous micas (bravaisite or illite), attapulgite, sepiolite, and the like.

The drilling fluids can also contain conventional weighting agents in effective weighting amounts, these agents including, for example, barium sulfate, barium carbonate, iron oxide, strontium sulfate (celestite), mixtures thereof, and the like. Weighting agents can be employed to give drilling fluids having a final density of up to about 22 pounds per U.S. gallon.

Other conventional additives such as emulsifiers, fermentation control agents, and the like can be employed if desired and so long as they are substantially inert to the agents of this invention.

The liquid base for the drilling fluids can be aqueous or organic or a combination thereof. The aqueous bases include fresh water (sodium chloride content of less than 1 weight percent and/or calcium content of less than 120 parts per million) and saline water which includes both brackish and sea water (sodium chloride content greater than 1 weight percent and/or calcium content greater than 120 parts per million). The agents of this invention are particularly useful in saline muds in that their dispersing and fluid loss control functions are not as adversely affected by the salts contamination as other known additives such as the chrome lignosulfonates.

The organic base drilling fluids employ oil or other similar hydrocarbonaceous material and are termed in the petroleum industry "oil-base" drilling fluids and "invert" drilling fluids.

The "oil-base" drilling fluids are those which contain large amounts, e.g. at least 95 weight percent, of an organic material. The organic material is normally present in the form of an emulsion with the external phase being the organic material and the remainder or internal phase being a minor amount of an aqueous liquid. Thus, "oil-base" drilling fluids can be water-in-oil emulsions.

Those drilling fluids which are normally termed "invert" are species of the water-in-oil emulsions which employ organic materials similar to those of the "oil-base" drilling fluids but which contain smaller amounts of the organic, external phase and larger amounts of the aqueous, internal phase.

The organic base employed in these drilling fluids, be they "oil-base" or "invert" is substantially a hydrocarbon materials, nonexclusive examples being crude oil, diesel oil, heavy petroleum refinery liquid residues, asphalt in its normal state, asphalt which has been oxidized by bubbling air therethrough to increase the softening point thereof, lampblack, and the like.

The agents of this invention are useful in any organic base material or materials conventionally used in preparing "oil-base" or "invert" drilling fluids (emulsions).

All the agents of this invention can be incorporated in the drilling fluids by simple mixing under ambient conditions of temperature and pressure for periods sufficient to give a substantially homogeneous mixture. The amount of agent added will vary widely depending upon the composition of the drilling fluid itself, the composition of the agent or agents themselves, the particular conditions in the particular well to which the drilling fluid is to be added, and on and on. Generally, an amount of agent effective for at least one of dispersing and fluid loss control is suitable. As a nonlimiting example, the drilling fluid can contain amounts of at least one agent of this invention of from about 0.1 to about 15 weight percent based on the total weight of the drilling fluid.

A full and complete disclosure of both aqueous base and organic base drilling fluids can be found in "Composition and Properties of Oil Well Drilling Fluids," W. F. Rogers, 3rd ed., Gulf Publishing Company, Houston, Tex. 1963, the disclosure of which is incorporated herein by reference. The drilling fluids containing the agents of this invention can be employed in any manner in which drilling fluids are conventionally employed at present. Thus, the drilling fluids can be employed in the drilling in or completing of a well, or the working over of an already drilled well. The drilling fluids containing the agents of this invention can also be employed as packer fluids, and the like, all of which uses are intended in this invention to fall within the scope of the term "drilling fluid."

In the following examples, all yield point, gel strength, and fluid loss measurements were made in accordance with the American Petroleum Institute's Recommended Practice entitled "Standard Procedure for Testing of Drilling Fluids," identified API RP 13B, 1st ed. November 1962, published by the American Petroleum Institute, New York, N.Y.

In the following examples, the various drilling fluid systems employed and referred to therein were prepared as follows:

Gyp drilling fluid.—Prepared by adding to each 350 milliliters of water, 85 grams of a clay blend composed of 50 weight percent East Texas bentonite, 25 weight percent Wyoming bentonite, and 25 weight percent grundite (illite). The water-clay mixture was stirred for 45 minutes and aged about 15 hours at room temperature. This drilling fluid had a yield point of about 100 and was then converted to a gyp system by adding 5 grams of calcium sulfate to 350 milliliters of the basic drilling fluid with stirring for about 30 minutes before use. The final gyp drilling fluid weighed 9.5 pounds per U.S. gallon.

Lab sea water drilling fluid.—Prepared by adding 40 grams of Wyoming bentonite and 70 grams East Texas bentonite treated with soda ash to 350 milliliters of natural sea water. The sea water-clay mixture was stirred for 30 minutes and aged about 16 hours at room temperature. Further mixing raised the apparent viscosity to between 30 to 40 cps. and this drilling fluid weighed 9.10 pounds per U.S. gallon.

Field sea water drilling fluid I.—A natural spud drilling fluid obtained from an offshore oil well in southern Louisiana. The drilling fluid weight was 9.2 pounds per U.S. gallon and contained 27.6 weight percent solids by weights. The drilling fluid had not been treated at the well site and analysis of its filtrate was 640 parts million (p.p.m. calcium, 1020 p.p.m. magnesium, 12,000 p.p.m. sodium, 22,000 p.p.m. chlorine, and 364 p.p.m. potassium.

Field sea water drilling fluid II.—A natural spud drilling fluid obtained from southern Louisiana which did not contain commercial clays but had a drilling fluid weight of 10.1 pounds per U.S. gallon and a pH of 9.5.

NaCl drilling fluid.—Prepared by mixing 9.5 pounds per U.S. barrel sodium chloride, 40 pounds per U.S. barrel of Wyoming bentonite, and 70 pounds per U.S. barrel of East Texas bentonite treated with soda ash in sufficient water to give the drilling fluid weight of 9.8 pounds per U.S. gallon.

The above drilling fluids will be hereinafter referred to as muds for sake of brevity although they have utility in the other aspects of drilling fluids, e.g. packer fluids.

In some of the following examples three separate agents according to this invention were prepared as follows:

Agent A.—Prepared by mixing 40 parts of water, 10 parts of lignite (ground and dried North Dakota), 1 part of sodium hydroxide, and 1 part of sodium bisulfite in the order set forth. The resulting mixture was reacted at 300° F. in a pressurized reaction vessel equipped with a mechanical stirrer for 6 hours with constant stirring. The pressure during the reaction at 300° F. varied from 50 to 80 p.s.i.g. The pH of the mixture dropped from 12.5 to 6.5 at the end of the reaction, the resulting product was sprayed dried.

Agent B.—Prepared by mixing 40 parts of water, 10 parts of lignite (ground and dried North Dakota), 1.25 parts of sodium hydroxide, and 1.25 parts of sodium meta-bisulfite. The mixture was placed in a heavy steel bomb and reacted with stirring for 16 hours at 300° F. The resulting product was spray dried.

Agent C.—Prepared by mixing 40 parts of water, 10 parts of lignite (ground and dried North Dakota), 1.6 parts of magnesium carbonate, 1.6 parts of sodium bisulfite, and 0.8 part of sodium hydroxide. The mixture was placed in a heavy steel bomb and stirred for 16 hours at 250° F. The resulting product was spray dried.

In some of the following examples, a chrome lignosulfonate was employed. This material was prepared from a commercially available calcium lignosulfonate which comprises most of the solid matter in the lignin liquor by-products resulting from the sulfite pulping of wood. Sufficient sulfuric acid was added to the calcium lignosulfonate solution to reduce the pH to a range of 1 to 2. The acidic solution was filtered to remove excess calcium sulfate. The resulting lignosulfonic acid solution was reacted with sufficient sodium dichromate dihydrate to convert all the acid to the chromium salt. Reaction requires approximately one hour at ambient temperatures and pressures. After reaction, the solution is spray dried to about 6 percent moisture.

In some of the following examples, a chrome lignite material was employed. This chrome lignite was prepared by reacting kiln dried crude North Dakota lignite with a 69 percent by weight aqueous solution of sodium dichromate dihydrate and a 50 percent by weight aqueous solution of potassium hydroxide. The reaction mixture is blended mechanically and aged from one to three days. During the aging period, the reaction mixture contains approximately 20–28 percent moisture. After aging, the mixture is pulverized and dried to a moisture content of 10–14 percent.

In the following examples the agents were mixed with the mud and then aged at various temperatures for 16 hours in an effort to obtain an indication of the thermal stability of the agents in the mud. The agents of this invention are operable in the mud without an aging treatment, e.g. the agents can be mixed with the mud and the resulting mixture used in a well without any intermediate aging step.

EXAMPLE I

Agent A, agent B, and a mixture of chrome lignosulfonate and agent A were mixed with separate portions of the gyp mud at ambient conditions of temperature and pressure until a homogeneous mixture was obtained and then aged at 250° F. for 16 hours. The resulting muds were then tested and the results are set forth in the following table:

TABLE I

|  | PPB[1] | Y.P.[2] | F.L.[3] |
|---|---|---|---|
| Agent A | 3 | 25 | 14 |
| Do | 10 | 54 | 10 |
| Cr-lignosulfonate/agent A | 8/4 | 1 | 6.8 |
| Agent B | 3 | 19 | 14.4 |
| Do | 10 | 47 | 10 |
| Cr-lignosulfonate/agent B | 8/4 | 5 | 6.6 |
| Cr-lignosulfonate | 3 | 78 | 26.3 |
| Do | 10 | 26 | 15 |
| Blank |  | 36 | 25.4 |

[1] Pounds of agent per barrel (U.S.) of mud.
[2] Yield point, pounds/100 square feet.
[3] API fluid loss, milliliters.

The yield point data show that substantially improved dispersing was obtained with agent A or B, or the combination of chrome lignosulfonate with agent A or B, over the gyp mud by itself (blank) or the chrome lignosulfonate by itself. Similar superior results were obtained for fluid loss with the runs containing agents A or B alone or in combination with the chrome lignosulfonate over the blank or the chrome lignosulfonate by itself.

EXAMPLE II

Agents A and B, chrome lignite, and chrome lignosulfonate are each added to the lab sea water mud by mixing at ambient conditions of temperature and pressure and aging for 16 hours at 150° F.

The results of these runs are set forth in the following table:

TABLE II

|  | A | | B | | Cr-lignite | | Cr-lignosulfonate | | Blank | |
|---|---|---|---|---|---|---|---|---|---|---|
|  | Y.P.[2] | F.L.[3] | Y.P.[2] | F.L.[3] | Y.P.[2] | F.L.[3] | Y.P.[2] | F.L.[3] | Y.P.[2] | F.L.[3] |
| Lab sea water mud, 10 p.p.b.[1] treatment | 31 | 6.8 | 18 | 8.4 | 15 | 15 | 3 | 20.2 | 60 | 24.8 |
| Field sea water mud, 10 p.p.b.[1] treatment | 0 | 7 | 0 | 7.8 | 2 | 42.6 | 0 | 29.4 | 20 | 53.8 |

[1,2,3] See footnotes 1, 2, 3 bottom of Table I.

It can be seen that agents A and B were superior to chrome lignite or chrome lignosulfonate in both sea water muds.

EXAMPLE III

Agent A and chrome lignosulfonate were mixed with the gyp mud and lab sea water mud at ambient conditions of temperature and pressure and then aged for 16 hours at varying aging temperatures. The results are set forth in the following table:

TABLE III

| Aging temperature, °F | Gyp mud system, 10 p.p.b.[1] treatment | | | | | |
|---|---|---|---|---|---|---|
|  | Agent A | | Cr-lignosulfonate | | Blank | |
|  | Y.P.[2] | F.L.[3] | Y.P.[2] | F.L.[3] | Y.P.[2] | F.L.[3] |
| 150 | 21 | 8.5 | 2 | 9.8 | 38 | 25.3 |
| 250 | 27 | 10 | 13 | 14.3 | 31 | 28.5 |
| 350 | 25 | 9.2 | 22 | 17.4 | 49 | 32.5 |
|  | Sea water mud system, 10 p.p.b.[1] treatment | | | | | |
| 150 | 7 | 8.7 | 1 | 22.1 | 34 | 29.1 |
| 250 | 11 | 15.3 | 13 | 28.2 | 44 | 29.6 |
| 350 | 28 | 18.1 | 22 | 36.6 | 47 | 38.3 |

[1,2,3] See footnotes 1, 2, 3 bottom of Table I

It can be seen that agent A was vastly superior to chrome lignosulfonate, particularly at the higher aging temperatures.

EXAMPLE IV

Mixtures of chrome lignosulfonate with agent A, agent B, and chrome lignite were made by adding the two materials to the gyp mud and mixing at ambient conditions of temperature. The results of these runs were as follows:

TABLE IV

| Aging temp °F.[a] | Cr-lignosulfonate/agent A, 8/4 p.p.b.[1] | | Cr-lignosulfonate/agent B, 8/4 p.p.b.[1] | | Cr-lignosulfonate/Cr-lignite, 8/4 p.p.b.[1] | | Blank Y.P.[2] |
|---|---|---|---|---|---|---|---|
|  | Y.P.[2] | F.L.[3] | Y.P.[2] | F.L.[3] | Y.P.[2] | F.L.[3] |  |
| 150 | 8 | 5.6 | 1 | 5.9 | 2 | 9.6 | 28 |
| 200 | 11 | 7.4 | 1 | 6.8 | 4 | 9.4 | 29 |
| 250 | 9 | 7.6 | 7 | 7.4 | 12 | 10 | 56 |
| 300 | 9 | 7.6 | 0 | 7.6 | 21 | 12.6 | 33 |
| 350 | 17 | 9.4 | 17 | 9 | 24 | 14 | 44 |

[1,2,3] See footnotes 1, 2, 3 bottom of Table I.

These data show that mixtures of chrome lignosulfonate and agents A or B were superior to the mixture of chrome lignosulfonate and chrome lignite.

EXAMPLE V

Agents A and B and chrome lignosulfonate were mixed with the gyp mud and lab sea water mud at ambient conditions of temperature and aged for 16 hours at 250° F. The results of these runs were as follows:

TABLE V

|  | Gyp muds | | Sea water muds | |
|---|---|---|---|---|
|  | Y.P.[2] | F.L.[3] | Y.P.[2] | F.L.[3] |
| Agent A[1] | 9 | 7.6 | 1 | 14.6 |
| Agent B[1] | 7 | 7.4 | 4 | 11.6 |
| Cr-lignosulfonate[1] | 39 | 13.6 | 0 | 23.6 |
| Blank | 56 | 30.2 | 42 | 29.6 |

[1] 12 pounds of additive per U.S. barrel of mud.
[2,3] See footnotes 2, 3 bottom of Table I.

EXAMPLE VI

Agents A and B in combination with chrome lignosulfonate, and the chrome lignite in combination with chrome liquosulfonate were tested in the lab sea water mud by mixing with the mud at ambient conditions of temperature and pressure and aging at either 150° F. or 250° F. for 16 hours. The results of these runs were as follows:

TABLE VI

| Sample 8/4 p.p.b.[1] | Aging temp., 150° F. | | Aging temp., 250° F. | |
|---|---|---|---|---|
| | Y.P.[2] | F.L.[3] | Y.P.[2] | F.L.[3] |
| Cr-lignosulfonate/agent A | 1 | 14.6 | 7 | 24.2 |
| Cr-lignosulfonate/agent B | 4 | 11.6 | 5 | 24 |
| Cr-lignosulfonate/Cr-lignite | 1 | 25.8 | 8 | 31 |
| Blank | 42 | 29.6 | 43 | 34.6 |

[1,2,3] See footnotes 1, 2, 3 bottom of Table I.

These data show that the combination of agents A or B with chrome lignosulfonate were superior to the combination of chrome lignite and chrome lignosulfonate.

EXAMPLE VII

Additional agents D, E, F, and G, according to this invention, were prepared by reacting lignite with sodium hydroxide and either sodium bisulfite or sodium meta-bisulfite at various reaction temperatures. The resulting agents were then tested in the gyp mud and the lab sea water mud by mixing with the muds at ambient conditions of temperature and aging for 16 hours at 150° F.

For each agent D through G, the amount of reactant indicated in the following table were stirred with 50 parts of lignite and 200 parts of water and, as indicated in the following table, either reacted in a heavy steel bomb with stirring for 16 hours at the temperatures indicated or refluxed for 3 hours at the boiling temperature of the liquid mixture. The final product of each agent was then spray dried and tested using 10 pounds per U.S. barrel of each additive in each mud.

TABLE VII

| Agent | NaOH, parts | NaHSO₃ parts | Na₂S₂O₅ (Na meta-bisulfite), parts | Reaction method | Reaction temp., °F. | GYP muds | | Sea water muds | |
|---|---|---|---|---|---|---|---|---|---|
| | | | | | | Y.P.[2] | F.L.[3] | Y.P.[2] | F.L.[3] |
| D | 5 | | 5 | P.V.[a] | 300 | 9 | 6.2 | 7 | 15.4 |
| E | 5 | 5 | | R.[b] | 212 | 11 | 7.4 | 12 | 20.4 |
| F | 5 | 5 | | P.V. | 400 | 2 | 9 | 17 | 26.2 |
| G | 5 | | 5 | P.V. | 400 | 1 | 9.4 | 17 | 26 |
| Blank | | | | | | 30 | 23 | 44 | 35.4 |

[a] Pressure vessel.
[b] Refluxing.
[2,3] See footnotes 2, 3 bottom of Table I.

The data show that even with very high reaction temperature of 400° F., the agents very substantially improved the fluid loss and dispersing characteristics of the muds.

EXAMPLE VIII

Additional agents were prepared using various cation donors (calcium salts) and various sulfite donors in various weight ratios with respect to one another. In each case, 1 part of lignite was stirred into 4 parts of the solution of a mixture of the cation donor and sulfite donor and reacted for 16 hours at 250° F. The details of the materials and amounts reacted are set forth in Table VIII.

Each agent was tested in a gyp mud and found to improve both the fluid loss and the yield point of the mud in the same manner as other examples hereinabove.

TABLE VIII

| Agent | Calcium salts | Sulfites or meta-bisulfites | Ratio[1] |
|---|---|---|---|
| H | 2% Ca(OH)₂ | 4% NaHSO₃ | 1:2 |
| I | 2% Ca(OH)₂ | 6% NAHSO₃ | 1:3 |
| J | 2% Ca(OH)₂ | 8% NaHSO₃ | 1:4 |
| K | 6% Ca(OH)₂ | 2% NaHSO₃ | 3:1 |
| L | 6% Ca(OH)₂ | 4% NaHSO₃ | 3:2 |
| M | 6% Ca(OH)₂ | 6% NaHSO₃ | 1:1 |
| N | 2% CaO | 4% NaHSO₃ | 1:2 |
| O | 2% CaO | 6% NaHSO₃ | 1:3 |
| P | 2% CaO | 8% NaHSO₃ | 1:4 |
| Q | 6% CaO | 2% NaHSO₃ | 3:1 |
| R | 6% CaO | 4% NaHSO₃ | 3:2 |
| S | 6% CaO | 6% NaHSO₃ | 1:1 |
| T | 4% Ca(OH)₂ | 2% NaHSO₃ | 2:1 |
| U | 4% Ca(OH)₂ | 4% NaHSO₃ | 1:1 |
| V | 4% Ca(OH)₂ | 6% NaHSO₃ | 2:3 |
| W | 4% Ca(OH)₂ | 2% Na₂S₂O₅ | 2:1 |
| X | 4% Ca(OH)₂ | 4% Na₂S₂O₅ | 1:1 |
| Y | 4% Ca(OH)₂ | 6% Na₂S₂O₅ | 2:3 |
| Z | 4% CaO | 2% NaHSO₃ | 2:1 |
| AA | 4% CaO | 4% NaHSO₃ | 1:1 |
| BB | 4% CaO | 6% NaHSO₃ | 2:3 |
| CC | 4% CaO | 2% Na₂S₂O₅ | 2:1 |
| DD | 4% CaO | 4% Na₂S₂O₅ | 1:1 |
| EE | 4% CaO | 6% Na₂S₂O₅ | 2:3 |

[1] Weight basis.

EXAMPLE IX

Additional agents were prepared in the manner set forth in Example VIII except that potassium meta-bisulfite was employed as the sulfite donor. The amounts and materials employed are set forth in the following table, 1 part of lignite being used per 4 parts of the solution of sodium hydroxide and potassium meta-bisulfite:

TABLE IX

| Agent | Water, parts | NaOH, parts | K₂S₂O₅ (K meta bisulfite), parts |
|---|---|---|---|
| FF | 400 | 10 | 10 |
| GG | 400 | 12.5 | 12.5 |

Each of agents FF and GG was employed in the gyp mud and found to substantially improve the fluid loss and yield point of that mud in the same manner as indicated in other examples hereinabove.

EXAMPLE X

Humic acid was extracted from lignite by two separate procedures, a base-acid extraction method and an organic-solvent extraction method. Humic acid is a black organic material with a complex chemical structure which is not presently known to a certainty. Humic acid is, however, soluble in sodium hydroxide, precipitated by hydrochloric acid, and insoluble in phenol.

The base-acid extraction method was carried out by stirring 200 grams of moisture-free lignite ground North Dakota into 80 milliliters of 10 percent sodium hydroxide solution. After stirring for 2 hours, the mixture was diluted to 8 liters and aged at room temperature for about 15 hours. The mixture was then acidified to a pH of 2 with concentrated hydrochloric acid. At this point humic acid precipitated and the precipitate was filtered out. The yield of humic acid was 74.8 percent.

The organic-solvent extraction method employed 50 grams of moisture-free lignite (ground North Dakota)

which was shaken in a separatory funnel with 500 milliliters of an 80/20 acetone water mixture for 15 minutes. The mixture was then allowed to settle for 15 minutes at room temperature. The soluble portion was then separated from the mixture by decantation and distilled to remove the acetone. The residue was washed and dried and produced a yield of humic acid of 89.2 percent.

The humic acids were analyzed for their sulfur content and it was found that the humic acid extracted by the sodium hydroxide-hydrochloric acid contained 0.6 percent sulfur while the humic acid extracted by acetone contained 0.5 percent sulfur.

Agents according to this invention were prepared from the thus extracted humic acid using several procedures.

In the first two procedures, 50 grams of the extracted humic acid was dissolved in 200 milliliters of water, 5 grams of sodium hydroxide, and 5 grams of sodium bisulfite. Part of this mixture was reacted for 3 hours at 205° F. and was coded agent 1A while another part of the mixture was reacted for 3 hours at 150° F. and was coded agent 1B.

The second two procedures employed 50 grams of humic acid dissolved in 200 milliliters of water, 5 grams of sodium hydroxide, and 5 grams of sodium meta-bisulfite. Part of the mixture was reacted for 3 hours at 210° F. and was coded agent 2A while another part of the mixture was reacted for 3 hours at 150° F. and was coded agent 2B.

As a measure of the sulfonation that took place, the content of agents 1A, 1B, 2A and 2B was determined by reprecipitating the products in an acid solution, thus removing unreacted sulfonating agents (sodium bisulfite and sodium metabisulfite). The results of the analysis are set forth in the following table:

TABLE X

| Agent | Percent sulfur | Percent conversion of sulfur |
|---|---|---|
| 1A | 1.5 | 75 |
| 1B | 1.5 | 75 |
| 2A | 1.7 | 77.5 |
| 2B | 1.7 | 77.5 |

The percent conversion of sulfur to the humic acid was calculated by comparing the sulfur contents of the sulfonating agent used and the end products obtained. Table X indicates that sulfonate groups are attached to the humic acid. By the sulfonation reaction, the polyelectrolytic property of this material is increased as the humic acid is converted to a hydrophilc compound. The polyelectrolytes have a substantial effect on the colloidal properties of finely divided solids such as clays in the muds.

A mixture of 8 pounds per U.S. barrel of chrome lignosulfonate with 4 pounds per U.S. barrel of agent 1A and a separate mixture of 8 pounds per U.S. barrel of chrome lignosulfonate with 4 pounds per U.S. barrel of agent 1B were tested in the lab sea water mud by mixing therewith at ambient conditions of temperature using 12 pounds per U.S. barrel of the mixture of chrome lignosulfonate and agent 1A or 1B. The fluid loss values of agent 1B (10 lb./bbl.) and agent 2B (10 lb./bbl.) are also recorded in the table. Agents 1A and 1B in mixture with chrome lignosulfonate as defined above in this paragraph were tested in 12 pounds per barrel amounts in the gyp mud. The resulting muds were then aged and tested as shown in the following table:

TABLE XI

| | Lab sea water mud | | | | Gyp mud | | | | | |
|---|---|---|---|---|---|---|---|---|---|---|
| | [1] 150 | | [1] 250 | | [1] 250 | | [1] 300 | | [1] 350 | |
| Agent | Y.P.[2] | F.L.[3] | Y.P.[2] | F.L.[3] | Y.P.[2] | F.L.[3] | Y.P.[2] | F.L.[3] | Y.P.[2] | F.L. |
| 1B | 16 | 16.5 | 6 | 26.7 | | | | | | |
| 2B | 13 | 20.5 | 7 | 28.7 | | | | | | |
| Cr-LS[4]/1A | 1 | 23.2 | 13 | 28.4 | 11 | 9 | 10 | 10.8 | 15 | 10.2 |
| Cr-LS[4]/1B | 3 | 23.8 | 12 | 28.4 | 25 | 9.6 | 9 | 12 | 21 | 10.2 |
| Blank | 42 | 29.6 | 43 | 34.6 | 56 | 30.2 | 33 | 24 | 44 | 24.6 |

[1] Aging temp., ° F. (16 hrs.).
[2,3] See footnotes 2, 3 bottom of Table I.
[4] Cr-LS = Chrome lignosulfonate.

EXAMPLE XI

The fluid loss properties of agents A and B (sulfonated sodium lignite agents) was compared to the fluid loss properties of sodium lignosulfonate and calcium lignosulfonate (lignin agents) in the gyp mud using 5 pounds per U.S. barrel of each agent in each test. The agents were incorporated in the mud by mixing at ambient conditions of temperature and pressure, and the mixtures were repeatedly aged at three different aging temperatures, each for 16 hours. Thereafter, the fluid loss was measured. The aging temperatures and fluid loss results are set forth in the following table:

TABLE XII

| | F.L. [1] | | |
|---|---|---|---|
| Heat aging temperature | 200° | 300° | 400° |
| Agent A | 10.3 | 14.7 | 12.5 |
| Agent B | 11.5 | 15.1 | 12.5 |
| Na-lignosulfonate | 22.2 | 18.3 | 15.6 |
| Ca-lignosulfonate | 35.5 | 38.5 | 21.6 |
| Blank | 27 | 27.4 | 25 |

[1] API fluid loss, milliters.

It can be seen from the foregoing table that the sulfonated sodium lignite agents were vastly superior to the sodium lignosulfonate and calcium lignosulfonate agents.

EXAMPLE XII

Agents A through C were compared with the sodium lignosulfonate of Example XI in the field sea water mud system using 10 pounds per U.S. barrel of each agent. The agents were mixed with the mud by stirring at ambient conditions of temperature and were aged repeatedly for various time periods at various temperatures as set forth in the following table:

TABLE XIII

| | Yield points [2] | | | | |
|---|---|---|---|---|---|
| Agent | A | B | C | Na-LS[1] | Blank |
| Heat aging conditions: | | | | | |
| 200° F./16 hours | 5 | 5 | 3 | 6 | |
| 300° F./16 hours | 7 | 6 | 3 | 5 | |
| 400° F./16 hours | 40 | 36 | 30 | 91 | |
| 200° F./3 days | 109 | 103 | 113 | 142 | |
| | Fluid loss [3] | | | | |
| 200 F./16 hours | 37.5 | 16.5 | 24.5 | 51.5 | 55 |
| 300° F./16 hours | 45 | 36.5 | 47.5 | 64 | 83 |
| 400° F./16 hours | 65 | 70 | 63 | 98 | 110 |
| 200° F./ 3 days††† | 48 | 17 | 20.2 | 100 | 88 |

[1] Sodium lignosulfonate.
[2,3] See footnotes 2, 3 bottom of Table I.

The results of these tests are set forth in the following table:

TABLE XIV

| Number/bbl.[1] | Agent B Temp., degree | Y.P.[2] | F.L.[3] |
|---|---|---|---|
| 5 | 200 | 6 | 39 |
|  | 300 | 33 | 55 |
|  | 400 | 88 | 58 |
| 10 | 200 | 5 | 17 |
|  | 300 | 22 | 49 |
|  | 400 | 30 | 57 |
| 15 | 200 | 1 | 10 |
|  | 300 | 18 | 26 |
|  | 400 | 16 | 33 |
| 20 | 200 | 3 | 7.2 |
|  | 300 | 12 | 15 |
|  | 400 | 17 | 18 |
|  | Na-lignosulfonate | | |
| 5 | 200 | 4 | 52 |
|  | 300 | 74 | 63 |
|  | 400 | 131 | 85 |
| 10 | 200 | 5 | 49 |
|  | 300 | 27 | 65 |
|  | 400 | 94 | 80 |
| 15 | 200 | 7 | 48 |
|  | 300 | 21 | 70 |
|  | 400 | 86 | 85 |
| 20 | 200 | 7 | 45 |
|  | 300 | 27 | 60 |
|  | 400 | 99 | 85 |
| Blank | 200 | 34 | 55 |
|  | 300 | 95 | 80 |
|  | 400 | 146 | 85 |

[1,2,3] See footnotes 1, 2, 3 bottom of Table I.

It can be seen from the above data that agent B showed greater heat stability over wide temperature ranges together with substantially superior yield point and fluid loss results as compared to the sodium lignosulfonate.

EXAMPLE XIV

Agent B and the sodium lignosulfonate of Example XI were compared in the field sea water mud in the same manner set forth in Example XIII. The results of these tests are set forth in the following table:

TABLE XV

| Aging temp., °F. (hours) | PPB[1] | Agent B Y.P.[2] | F.L.[3] | G.S.[4] | Na lignosulfonate Y.P.[2] | F.L.[3] | G.S.[4] |
|---|---|---|---|---|---|---|---|
| 400(16) | 5 | 89 | 60 | 63 | 131 | 85 | 7 |
|  | 10 | 30 | 44 | 27 | 96 | 80 | 62 |
|  | 15 | 18 | 29 | 20 | 88 | 80 | 54 |
|  | 20 | 14 | 18 | 25 | 99 | 83 | 60 |
| 300(16) | 5 |  | 55 |  |  | 63 |  |
|  | 10 |  | 35 |  |  | 65 |  |
|  | 15 |  | 23 |  |  | 69 |  |
|  | 20 |  | 15 |  |  | 70 |  |
| 200(16) | 5 |  | 38 |  |  | 50 |  |
|  | 10 |  | 16 |  |  | 49 |  |
|  | 15 |  | 9 |  |  | 48 |  |
|  | 20 |  | 6 |  |  | 46 |  |

[1,2,3] See footnotes 1, 2, 3, bottom of Table I.
[4] Gel strength after 10 minutes, pounds/100 square feet.

It can be seen from the above table that the yield points and fluid loss characteristics of agents A through C were far superior to that of the sodium lignosulfonate.

EXAMPLE XIII

Agent B was compared with the sodium lignosulfonate of Example XI in the field sea water mud by mixing various amounts of each agent in separate portions of the mud at ambient conditions of temperature and pressure.

It can be seen from the above data that agent B had superior yield point, fluid loss, and gel strength properties at all additive concentration levels and at all aging temperatures. It can further be seen from the data that the sodium lignosulfonate had very poor fluid loss control action at the lower aging temperatures and did not control fluid loss at all at the higher aging temperatures. It is further apparent that increasing the concentration of sodium lignosulfonate does not help the poor fluid loss control characteristics.

EXAMPLE XV

Ferrous sulfate was used as an iron metal source for complex formation with sulfonated lignite. Fifty grams of ground lignite, 200 milliliters of water and the indicated amounts of sodium hydroxide, sulfonating agent, and metal salts as set forth in the following table were mixed and reacted in a heavy steel bomb at 300° F. for 16 hours. The products were spray dried and tested in mixture with chrome-lignosulfonate in the gyp mud. The mixture of the various agents and the chrome-lignosulfonate was mixed into the mud and then aged for 16 hours at 150° F. The results were as follows:

TABLE XVI

| Agent | Percent[4] of NaOH | NaHSO_3 | FeSO_4·6H_2O | Cr-lignosulfonate/ agent 8/4 p.p.b.[1] Y.P.[2] | F.L.[3] | 10 p.p.b.[1] treatment of agent alone Y.P.[2] | F.L.[3] |
|---|---|---|---|---|---|---|---|
| 1 | 2.5 | 2.5 | 2 | 3 | 6.6 | 14 | 6 |
| 2 | 2.5 | 2.5 | 3 | 1 | 6.4 |  |  |
| 3 | 2.5 | 2.5 | 4 | 2 | 6.8 |  |  |
| 4 | 2.5 | 2.5 | 5 | 1 | 6.8 |  |  |
| 5 | 3 | 2 | 3 | 3 | 6.8 |  |  |
| 6 | 2 | 3 | 3 | 4 | 6.6 |  |  |
| 7 | 1 | 3 | 3 | 1 | 9.6 |  |  |
| 8 | 3 | 3 | 3 | 3 | 6.2 | 16 | 5.8 |
| 9 | 2 | 4 | 3 | 2 | 7.2 |  |  |
| 10 | 4 | 5 | 3 | 7 | 6.4 |  |  |
| 11 | 3 | 5 | 2 | 9 | 6.2 |  |  |
| 12 | 5 | 5 | 2 | 2 | 6.2 | 13 | 5.8 |
| Blank |  |  |  | 31 | 23.4 | 28 | 23.2 |

[1,2,3] See footnotes 1, 2, 3 bottom of Table I.
[4] Based on the weight of water used.

These data show that the iron complex was useful in substantially reducing yield point and fluid loss of the gyp mud when used alone or in combination with chrome lignosulfonate.

EXAMPLE XVI

Two systems were employed to make sulfonated lignite;

System A:
    Lignite, 50 grams
    Water, 200 milliliters
    Sodium bisulfite (2.5%), 5 grams
    Sodium hydroxide (2.5%), 5 grams System B:
    Lignite, 50 grams
    Water, 200 milliliters
    Sodium bisulfite (5%), 10 grams
    Sodium hydroxide (5%), 10 grams Mixtures of the materials of systems A and B were prepared and reacted at 300° F. for 6 hours. A metal source as listed in the following table was then added to the sulfonated lignite reaction mixture and further reaction carried out at 300° F. for 16 hours. The agents were spray dried and used alone or in combination with chrome lignosulfonate by mixing with the gyp mud and aging for 16 hours at 150° F. The results are set forth in the following table:

TABLE XVII

| Agent | System | Chemical formulation Metals, percent [4] | Cr-lignosulfonate/agent 8/4 p.p.b.[1] | | 10 p.p.b. treatment of agent alone | | 3 p.p.b. treatment of agent alone | |
|---|---|---|---|---|---|---|---|---|
| | | | Y.P.[2] | F.L.[3] | Y.P.[2] | F.L.[3] | Y.P.[2] | F.L.[3] |
| 13 | A | 2 FeSO$_4$·6H$_2$O | 5 | 6 | 11 | 7 | | |
| 14 | A | 4 FeSO$_4$·6H$_2$O | 3 | 6.4 | 8 | 6.6 | | |
| 15 | A | 2 Cr$_2$(SO$_4$)$_3$nH$_2$O | 4 | 6.2 | 12 | 7.4 | | |
| 16 | A | 4 Cr$_2$(SO$_4$)$_3$nH$_2$O | 3 | 7.4 | 23 | 8.6 | | |
| 17 | A | 2 Co SO$_4$ 7H$_2$O | 4 | 6.4 | 19 | 7 | | |
| 18 | A | 4 Co SO$_4$ 7H$_2$O | 4 | 6.4 | 15 | 6.8 | | |
| 19 | B | 2 FeSO$_4$·6H$_2$O | 2 | 6.2 | 12 | 5.4 | 13 | 10.4 |
| 20 | B | 4 FeSO$_4$·6H$_2$O | 3 | 5.8 | 14 | 5.8 | | |
| 21 | B | 2 Cr$_2$(SO$_4$)$_3$·nH$_2$O | 3 | 6.2 | 9 | 5.4 | 10 | 9.8 |
| 22 | B | 4 Cr$_2$(SO$_4$)$_3$·nH$_2$O | 4 | 6.2 | 13 | 5.6 | | |
| 23 | B | 2 Co SO$_4$·7H$_2$O | 1 | 6.2 | 12 | 6 | | |
| 24 | B | 4 Co SO$_4$·7H$_2$O | 2 | 6 | 10 | 5.8 | | |
| Blank | | | 31 | 23.6 | 28 | 23.2 | 31 | 23.6 |

[1][2][3] See footnotes 1, 2, 3 bottom of Table I.
[4] Based on the weight of water used.

EXAMPLE XVII

Agent 8 of Example XV and agents 13 through 22, and 24 of Example XVI, agents A and B of Example I, chrome lignite, and chrome lignosulfonate were each mixed into the lab sea water mud, field sea water mud II, and NaCl mud followed by aging for 16 hours at various temperatures. The results of these tests are set forth in the following table:

as a complexing material. The chromium salts were added to the sulfonated lignite of system A and reacted for 6 hours at 300° F. after which the product was spray dried. Thus, these agents were prepared by the two step process wherein the sulfonated lignite was prepared first followed by addition and reaction of the complexing chromium material. The chromium materials used are set forth in Table XIX:

Additional agents were also prepared using the one step reaction method wherein the complexing chromium

TABLE XVIII

| Agent, 10#/bbl.[1] | Lab sea water mud aged at— | | | | Field sea water mud II aged at— | | | | NaCl mud aged at— | | | |
|---|---|---|---|---|---|---|---|---|---|---|---|---|
| | 150° F. | | 250° F. | | 150° F. | | 250° F. | | 150° F. | | 250° F. | |
| | Y.P.[2] | F.L.[3] | Y.P.[2] | F.L.[3] | Y.P.[2] | F.L.[3] | Y.P.[2] | F.L.[3] | Y.P.[2] | F.L.[3] | Y.P.[2] | F.L.[3] |
| 8 | 5 | 8.2 | 9 | 13.9 | | | | | | | | |
| 13 | | | | | 0 | 12.8 | 0 | 9.8 | 18 | 7.4 | 66 | 13.2 |
| 14 | 7 | 10.8 | | | 0 | 16.4 | 0 | 15.6 | 13 | 7.6 | 58 | 10.5 |
| 15 | 8 | 9.8 | | | 1 | 32.6 | 1 | 11.1 | 12 | 7.6 | 27 | 9.2 |
| 16 | | | | | 0 | 13 | | 42 | 20 | 11 | 20 | 9.8 |
| 18 | 6 | 9.2 | | | | | | | | | | |
| 19 | 12 | 15.4 | 8 | 19.2 | 1 | 15 | 6 | 48.5 | 38 | 12.8 | 76 | 31.8 |
| 20 | 6 | 12.4 | 7 | 16.6 | 2 | 12.2 | 3 | 30.5 | 43 | 14.6 | 75 | 25 |
| 21 | 5 | 7.4 | 7 | 9 | 0 | 7.8 | 1 | 12.5 | 28 | 11.2 | 52 | 15 |
| 22 | 2 | 6.8 | 5 | 6.8 | 0 | 6.4 | 0 | 9.8 | 17 | 6.8 | 16 | 12.6 |
| 24 | 3 | 15.2 | | | | | | | | | | |
| A | 31 | 6.8 | 17 | 10 | 0 | 7 | 1 | 9.8 | 53 | 7.6 | 112 | 11.6 |
| B | 18 | 8.4 | | | 0 | 7.8 | 0 | 21.3 | 62 | 11 | 115 | 14.8 |
| Cr-LG [4] | 15 | 15 | 48 | 15 | 2 | 42.6 | 0 | 28.6 | 23 | 11.4 | 43 | 15.8 |
| Cr-Lignin [5] | 3 | 20.2 | | | 0 | 29.4 | 0 | 58.8 | 23 | 17.2 | 24 | 23.2 |
| Blank | 60 | 24.8 | 42 | 29.8 | 20 | 53.8 | 16 | 58.6 | 51 | 20.2 | 60 | 31.4 |

[1][2][3] See footnotes 1, 2, 3 bottom of Table I.
[4] Cr-LG—chrome lignite.
[5] Cr-lignin—chrome lignosulfonate.

TABLE XIX

Agent:   Chromium compounds
25 ____ 4 gr. CrCl$_3$·6H$_2$O.
26 ____ 8 gr. CrCl$_3$·6H$_2$O.
27 ____ 4 gr. Cr(CH$_3$COO)$_3$nH$_2$O.
28 ____ 8 gr. Cr(CHCOO)$_3$nH$_2$O.
29 ____ 4 gr. Cr$_5$(OH)$_6$Cl$_9$·12H$_2$O (basic chromic chloride with 29 weight percent Cr).
30 ____ 8 gr. Cr$_5$(OH)$_6$Cl$_9$·12H$_2$O (basic chromic chloride with 29 weight percent Cr).
31 ____ 4 gr. Cr$_3$(OH)$_2$(CH$_3$COO)$_7$ (basic chromic acetate).
32 ____ 8 gr. Cr$_3$(OH)$_2$(CH$_3$COO)$_7$ (basic chromic acetate).
33 ____ 4 gr. Cr(OH)SO$_4$ with 23.5 weight percent as Cr$_2$O$_3$.
34 ____ 8 gr. Cr(OH)SO$_4$ with 23.5 weight percent as Cr$_2$O$_3$.
35 ____ 4 gr. Cr$_2$(OH)$_4$SO$_4$ with 25 weight percent as Cr$_2$O$_3$.
36 ____ 8 gr. Cr$_2$(OH)$_4$SO$_4$ with 25 weight percent as Cr$_2$O$_3$.

EXAMPLE XVIII

Additional agents were prepared according to this invention using sulfonated lignites prepared according to system A of Example XVII and various chromium salts salt was present during the formation of the sulfonated lignite. In these tests the sulfonated lignite was formed using A of Example XVI but the chromium material was added to the chemicals used in system A and the single step reaction carried out at 300° F. for 16 hours. The chromium materials employed are set forth in the following table:

TABLE XX

| Agent | NaOH (grams) | Chromium compounds |
|---|---|---|
| 37 | 10 | CrCl$_3$·6H$_2$O 8 grams. |
| 38 | 12.5 | CrCl$_3$·6H$_2$O 8 grams. |
| 39 | 10 | Cr(CH$_3$COO)$_{3n}$H$_2$O 8 grams. |
| 40 | 12.5 | Cr(CH$_3$COO)$_{3n}$H$_2$O 8 grams. |
| 41 | 10 | Cr$_5$(OH)$_6$Cl$_9$·12H$_2$O (basic chromic chloride with 29 weight percent Cr) 8 grams. |
| 42 | 12.5 | Cr$_5$(OH)$_6$Cl$_9$·12H$_2$O (basic chromic chloride with 29 weight percent Cr) 8 grams. |
| 43 | 10 | Cr$_3$(OH)$_2$(CH$_3$COO)$_7$ (basic chromic acetate) 8 grams. |
| 44 | 12.5 | Cr$_3$(OH)$_2$(CH$_3$COO)$_7$ (basic chromic acetate) 8 grams. |
| 45 | 10 | Cr(OH)SO$_4$ with 23.5 weight percent Cr as Cr$_2$O$_3$ 8 grams. |
| 46 | 12.5 | Cr(OH)SO$_4$ with 23.5 weight percent Cr as Cr$_2$O$_3$ 8 grams. |
| 47 | 10 | Cr$_2$(OH)$_4$SO$_4$ with 25 weight percent Cr as Cr$_2$O$_3$ 8 grams. |
| 48 | 12.5 | Cr$_2$(OH)$_4$SO$_4$ with 25 weight percent Cr as Cr$_2$O$_3$ 8 grams. |

All of these agents as well as chrome lignite and chrome lignosulfonate were tested in the gyp mud and lab sea water mud by mixing and aging for 16 hours at either 150° F. or 250° F. as indicated in the following table:

lignite for 3 hours at 150° C. in a Parr reactor during which time the pressure reached 130 p.s.i.g. The treated mud was then aged for 16 hours at the temperature indicated in the following table:

TABLE XXI

| Agent | Gyp, 150° F. | | Lab sea water II, 150° F. | | Gyp, 250° F. | | Lab sea water II, 250° F. | |
|---|---|---|---|---|---|---|---|---|
| | Y.P.[2] | F.L.[3] | Y.P.[2] | F.L.[3] | Y.P.[2] | F.L.[3] | Y.P.[2] | F.L.[3] |
| 25 | 10 | 6.4 | 2 | 6.8 | 31 | 7.8 | 6 | 10.3 |
| 26 | 13 | 7 | | | 25 | 9.4 | 2 | 10.8 |
| 27 | 10 | 6.2 | 2 | 6.8 | 32 | 7.6 | 6 | 8.8 |
| 28 | 16 | 6.8 | | | 28 | 8.8 | 6 | 9.2 |
| 29 | 9 | 6 | 3 | 7.4 | 31 | 7.2 | 7 | 10.2 |
| 30 | 11 | 7.4 | | | 19 | 8.8 | 4 | 10.1 |
| 31 | 9 | 6.2 | 2 | 6.8 | 27 | 7 | 6 | 9 |
| 32 | 14 | 6.8 | | | 24 | 8.2 | 5 | 9.3 |
| 33 | 10 | 6 | 3 | 7.8 | 35 | 6.6 | 9 | 12.4 |
| 34 | 15 | 6 | 2 | 7 | 31 | 6.8 | 4 | 7.6 |
| 35 | 9 | 5.8 | 3 | 6.8 | 42 | 6.8 | 7 | 12 |
| 36 | 15 | 5.8 | 3 | 7.2 | 36 | 6.8 | 9 | 9.6 |
| 37 | 11 | 7 | | | 39 | 8.6 | 4 | 12.9 |
| 38 | 17 | 6.6 | 4 | 8.4 | 43 | 8.4 | 6 | 16.4 |
| 39 | 14 | 6.8 | | | 40 | 8.8 | 6 | 14.1 |
| 40 | 12 | 6.8 | 4 | 9.2 | 50 | 8.6 | 10 | 16.1 |
| 41 | 12 | 6.4 | | | 37 | 9 | 10 | 11.8 |
| 42 | 11 | 6.3 | 4 | 8.4 | 39 | 8.4 | 8 | 15.2 |
| 43 | 11 | 6.6 | 2 | 7 | 30 | 8 | 6 | 12.6 |
| 44 | 13 | 6.6 | 3 | 9 | 35 | 8.2 | 8 | 14.6 |
| 45 | 11 | 6 | 3 | 7.6 | 38 | 7.2 | 12 | 12.4 |
| 46 | 12 | 5.4 | 4 | 8.8 | 36 | 7 | 7 | 16.8 |
| 47 | 13 | 5.8 | 2 | 8.3 | 44 | 7.6 | 9 | 14.3 |
| 48 | 12 | 5.6 | 4 | 7.8 | 29 | 6.8 | 7 | 19.2 |
| Cr-lignite | 96 | 11.6 | 24 | 18 | [1] tttm | 13.2 | 61 | 20.2 |
| Cr-lignosulfonate | 4 | 9 | 1 | 19.3 | 0 | 11.6 | 10 | 29.6 |
| Blank | 30 | 22.8 | 47 | 25.4 | 43 | 25.4 | 40 | 33.2 |

[1] Too thick to measure.
[2],[3] See footnotes 2,3 bottom of Table I.

EXAMPLE XIX

A mixture of 300 grams lignite (ground and dried North Dakota), 1200 milliliters water, 60 grams sodium hydroxide, and 60 grams sodium bisulfite were reacted in a Parr reactor at 150° C. and 50 to 70 p.s.i.g. for 6 hours. This agent is substantially equivalent to agent A hereinabove.

This agent was then modified by reaction with 48 grams of ferrous sulfite ($FeSO_4 \cdot 7H_2O$) and reacted for 6 hours at 150° C. during which the pressure reached 105 p.s.i.g., since reaction was carried out in a pressure vessel.

A series of agents was prepared in heavy steel bomb using either ferrous sulfate or chromium potassium sulfates and systems A or B of Example XVI. The iron and chromium salts were added to systems A or B and the mixture then reacted for 6 hours at 300° F. All of these products as well as chrome lignosulfonate were tested in the gyp mud using a 10 pound per U.S. barrel treatment and aging for 16 hours at either 150° F. or 250° F. The results of these tests are set forth in the following table:

TABLE XXII

| Agents | Sample description | Gyp mud, 150° F. | | Gyp mud, 250° F. | |
|---|---|---|---|---|---|
| | | Y.P.[2] | F.L.[3] | Y.P.[2] | F.L.[3] |
| 60 | Equivalent to agent A | 18 | 5.4 | | |
| 61 | Agent 60 modified with $Fe_2(SO_4)_3$ | 16 | 5.7 | | |
| 49 | $Fe_2(SO_4)_3$, 2% solution (A)[a] | 15 | 7.4 | 26 | 8.5 |
| 50 | $Fe_2(SO_4)_3$, 4% solution (A)[a] | 9 | 9.7 | 25 | 8.8 |
| 51 | $CrK(SO_4)_2 12H_2O$, 4% solution (A)[a] | 19 | 7 | 35 | 7.7 |
| 52 | $Fe_2(SO_4)_3$, 2% solution (B)[b] | 14 | 5.4 | 29 | 6.9 |
| 53 | $Fe_2(SO_4)_3$, 4% solution (B)[b] | 13 | 5.6 | 35 | 6.8 |
| 54 | $CrK(SO_4)_2 12H_2O$, 4% solution (B)[b] | 12 | 5.6 | 29 | 6.6 |
| Cr-ligno-sulfonate | | 21 | 8.5 | 19 | 13 |
| Blank | | 34 | 23 | 63 | 28.8 |

[a] Initial formula A (50 grams lignite 200 cc. water, 5 grams NaOH, 5 g. $NaHSO_3$).
[b] Initial formula B (50 grams lignite, 200 cc. water, 10 grams NaOH, 10 g. $NaHSO_3$).

NOTE.—See footnotes 2, 3 bottom of Table I.

EXAMPLE XX

A prehydrated bentonite mud was prepared by mixing 20 pounds per U.S. barrel of Wyoming bentonite with 42 gallons of fresh water followed by aging for 16 hours with stirring at 300° F. This mud weighed 8.7 pounds per gallon. The mud was then treated with 5 pounds per U.S. barrel of agent 60 of Example XIX and a new agent (57) prepared by reacting 48 grams of chromium sulfate and 1200 milliliters of water and 300 grams of sulfonated

TABLE XXIII

| Agent | Prehydrated Bentonite mud | | |
|---|---|---|---|
| | Temp., ° F. | Y.P.[2] | F.L.[3] |
| 60 | 200 | 16 | 17.9 |
| | 300 | 36 | 16.6 |
| | 400 | 35 | 16.7 |
| 57 | 200 | 15 | 14.3 |
| | 300 | 18 | 15.4 |
| | 400 | 12 | 14.7 |
| Blank, causticized [a] | 200 | 76 | 68 |
| | 300 | 58 | 92.5 |
| | 400 | 6 | 200 |

[a] Completely flocculated after aging at 400° F., causticized by adding 2 lb./bbl. of sodium hydroxide was mixed with the base mud before heat aging.

NOTE.—See footnotes 2, 3 bottom of Table I.

These muds showed excellent stability and fluid loss control over a wide range of temperature.

EXAMPLE XXI

The gyp mud was prehydrated by heat aging for 16 hours at 300° F. to eliminate the effects of temperature on the mud when tested with the agents of this invention at high temperatures. The prehydrated gyp mud was then treated with 5 pounds per U.S. barrel of various agents and heat aged with stirring for 16 hours at the temperatures indicated in the following table:

ious aging temperatures over a 16 hour aging period. The results of these tests are set forth in the following table:

TABLE XXV

| Lbs./bbl.[1] | Temp., °F. | Field sea water mud II | | | | | | | |
|---|---|---|---|---|---|---|---|---|---|
| | | Agent 65 | | Agent 66 | | Agent 67 | | Base mud | |
| | | Y.P.[2] | F.L.[3] | Y.P.[2] | F.L.[3] | Y.P.[2] | F.L.[3] | Y.P.[2] | F.L.[3] |
| 5 | 200 | 3 | 41 | 2 | 54.3 | 2 | 53 | 34 | 55 |
| | 300 | 9 | 60 | 4 | 63 | 5 | 70 | 95 | 80 |
| | 400 | 65 | 80 | 39 | 75 | 60 | 80 | 146 | 85 |
| 10 | 200 | 0 | 21.6 | 1 | 16 | 1 | 33 | | |
| | 300 | 1 | 34 | 2 | 50 | 1 | 60 | | |
| | 400 | 76 | 57 | 8 | 63 | 18 | 70 | | |
| 15 | 200 | 2 | 10.5 | 2 | 9 | 1 | 13 | | |
| | 300 | 2 | 16.6 | 1 | 28 | 1 | 33 | | |
| | 400 | 8 | 44 | 3 | 52 | 9 | 29 | | |
| 20 | 200 | 1 | 6 | 7 | 4 | 5 | 6 | | |
| | 300 | 9 | 8 | 0 | 7 | 2 | 18.8 | | |
| | 400 | 36 | 17.5 | 7 | 11 | 72 | 10 | | |

[1,2,3] See footnotes 1, 2, 3 bottom of Table I.

TABLE XXIV

| Agents | Prehydrated gyp muds | | |
|---|---|---|---|
| | Temp., °F. | Y.P.[2] | F.L.[3] |
| 57 | 200 | 37 | 9.6 |
| | 300 | 50 | 12.1 |
| | 400 | 100 | 14 |
| Lignite | 200 | 140 | 13.8 |
| | 300 | 148 | 17.8 |
| | 400 | 115 | 17 |
| Cr-lignite | 200 | 146 | 12.9 |
| | 300 | 138 | 19.9 |
| | 400 | 113 | 16.2 |
| Cr-lignosulfonate | 200 | 18 | 17.6 |
| | 300 | 35 | 20 |
| | 400 | 100 | 18.5 |
| Blank | 200 | 24 | 27 |
| | 300 | 30 | 29.4 |
| | 400 | 106 | 25 |

NOTE.—See footnotes 2, 3 bottom of Table 1.

It can be seen from the table that agent 57 shows most favorable fluid loss control over viscosified lignite, chrome lignite, or chromium lignosulfonate.

EXAMPLE XXII

Three differnt lignite chromium complexes were prepared using three different chromium compounds using the same formula employed for preparing agent 57. First, an intermediate product was prepared by reacting for 4 hours at 150° C. a mixture of 300 grams lignite (ground and dried North Dakota), 1200 grams water, 60 grams sulfonating agent, and 60 grams sodium hydroxide. Forty-eight grams of the chromium salt was then added to the intermediate product and reacted further for 3 hours at 150° C. followed by spray drying. The agents produced were Agent 65 _____ Chromic sulfate $Cr_2(SO_4)_3 \cdot nH_2O$.
Agent 66 _____ Chromic chloride $CrCl_3 \cdot 6H_2O$.
Agent 67 _____ Potassium chrome alum $CrK(SO_4)_2 12H_2O$.

These lignites-chrome complexes were tested in the field sea water mud in various concentrations and with var- Table XXV shows that agent 65 is excellent in fluid loss control and agent 66 is equally as excellent in yield point control. For example, 10 pounds per barrel of agent 66 can control and maintain the yield point in inorganic salt contaminated muds (sea water muds) at least up to 400° F.

Reasonable variations and modifications are possible within the scope of this disclosure without departing from the spirit and scope of this invention.

What is claimed is:

1. A drilling fluid dispersing and/or fluid loss agent comprising the reaction product of (1) sulfonated lignite in which the lignite is sulfonated with from about 5 to about 50 parts, by weight, of at least one material selected from the group consisting of the sulfites and bisulfites of sodium, potassium, calcium, magnesium and ammonium, sulfurous acid and sulfur dioxide and (2) at least one material selected from the group consisting of ferrous or ferric sulfate, chromous or chromic sulfate, chromous or chromic chloride, chromous or chromic acetate, basic chromium chloride, basic chromium acetate, basic chromium sulfate, potassium chrome alum, maganese sulfate and zinc sulfate, said material comprising from about 5 to about 25 parts per 100 parts of (1).

References Cited
UNITED STATES PATENTS

| 3,039,958 | 6/1962 | Monroe | 252—85 |
| 3,135,728 | 6/1964 | Monroe | 260—125 |
| 3,135,727 | 6/1964 | Monroe | 260—125 |
| 3,352,902 | 11/1967 | Moschopedis | 260—507 |
| 3,391,173 | 7/1968 | Stratton | 260—429 |

DANIEL E. WYMAN, Primary Examiner

A. P. DEMERS, Assistant Examiner

U.S. Cl. X.R.

252—85; 260—125, 429 R, 429.9, 438.1, 438.5, 439 R